US011472105B2

(12) United States Patent
Hardee et al.

(10) Patent No.: US 11,472,105 B2
(45) Date of Patent: Oct. 18, 2022

(54) METHODS AND SYSTEMS FOR 3D PRINTING WITH MODIFIABLE SUPPORT

(71) Applicant: INTERNATIONAL BUSINESS MACHINES CORPORATION, Armonk, NY (US)

(72) Inventors: Christopher J. Hardee, Raleigh, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 431 days.

(21) Appl. No.: 15/401,247

(22) Filed: Jan. 9, 2017

(65) Prior Publication Data

US 2018/0194079 A1 Jul. 12, 2018

(51) Int. Cl.
| | | |
|---|---|---|
| *B33Y 10/00* | (2015.01) | |
| *B29C 64/245* | (2017.01) | |
| *B33Y 30/00* | (2015.01) | |
| *B33Y 50/02* | (2015.01) | |
| *B29C 64/106* | (2017.01) | |
| *B29C 64/386* | (2017.01) | |

(52) U.S. Cl.
CPC .......... *B29C 64/245* (2017.08); *B29C 64/106* (2017.08); *B29C 64/386* (2017.08); *B33Y 10/00* (2014.12); *B33Y 30/00* (2014.12); *B33Y 50/02* (2014.12)

(58) Field of Classification Search
CPC .... B29C 64/106; B29C 64/112; B29C 64/118
See application file for complete search history.

(56) References Cited

U.S. PATENT DOCUMENTS

| | | | |
|---|---|---|---|
| 6,401,002 B1 | 6/2002 | Jang et al. | |
| 6,658,314 B1 | 12/2003 | Gothait | |
| 9,280,616 B2 | 3/2016 | Cudak et al. | |
| 10,083,633 B2* | 9/2018 | Bostick | .......... G09B 5/02 |
| 2013/0307194 A1* | 11/2013 | Elsey | ............ B29C 64/188 264/401 |
| 2014/0220168 A1* | 8/2014 | Perez | ............ B29C 37/0007 425/161 |
| 2015/0290880 A1 | 10/2015 | Cudak et al. | |
| 2015/0293722 A1 | 10/2015 | Cudak et al. | |
| 2015/0294030 A1 | 10/2015 | Cudak et al. | |

(Continued)

FOREIGN PATENT DOCUMENTS

| | | |
|---|---|---|
| JP | 2000280355 A * | 10/2000 |
| JP | 2016150466 A * | 8/2016 |

OTHER PUBLICATIONS

Masanori (JP 2016-150466)—Machine Translation.*

(Continued)

*Primary Examiner* — Jacob T Minskey
*Assistant Examiner* — Adrien J Bernard
(74) *Attorney, Agent, or Firm* — Griffiths & Seaton PLLC

(57) ABSTRACT

Embodiments for 3D printing an object by a processor are described. An object is selected to be printed by a 3D printer. The 3D printer includes a structure. The structure is modified based on the selected object. The selected object is 3D printed by the 3D printer. At least a portion of the selected object is supported by the modified structure while the selected object is being 3D printed by the 3D printer.

8 Claims, 14 Drawing Sheets

(56) References Cited

U.S. PATENT DOCUMENTS

| | | | | |
|---|---|---|---|---|
| 2015/0360421 | A1 | 12/2015 | Burhop et al. | |
| 2016/0144434 | A1 | 5/2016 | Burd | |
| 2016/0288416 | A1* | 10/2016 | Robles Flores | B33Y 50/00 |
| 2017/0197363 | A1* | 7/2017 | Frantzdale | B29C 64/135 |
| 2017/0252806 | A1* | 9/2017 | Wienberg | B22F 10/20 |
| 2017/0266888 | A1* | 9/2017 | Pang | B29C 64/20 |
| 2020/0329814 | A1* | 10/2020 | Wang | B29C 64/245 |
| 2021/0187847 | A1* | 6/2021 | Smith, III | B22F 12/00 |
| 2021/0206072 | A1* | 7/2021 | Chae | B33Y 30/00 |

OTHER PUBLICATIONS

Tochimoto (JP 2000-280355)—Machine Translation.*
English language human translation of JP 20001010.*
English language human translation of JP 2016-150466.*
Meaning of the term Curing—https://en.wikipedia.org/wiki/Curing_(chemistry))—Accessed Dec. 9, 2019.*
Meaning of the term Resin—https://en.wikipedia.org/wiki/Synthetic_resin—Accessed Dec. 9, 2019.*
Definition of the term "resin"—(https://web.archive.org/web/20150628062905/https://modernplastics.com/technical-resources/plastics-glossary-of-terms/#r)). Available online Jun. 28, 2015.*
Brownlee, "MIT Invents a Shapeshifting Display You can Reach Through and Touch," http://www.fastcodesign.com/3021522/innovation-by-design/mit-invents-a-shapeshifting-display-you-can-reach-through-and-touch, Nov. 12, 2013 (22 pages).
Jokic et al., "A Radically New 3D Printing Method," http://www.mataerial.com/. May 18, 2013 (4 pages).
"Tree Support Module," Materialise Magics, 3D Printing Software, Nov. 7, 2014 (2 pages).
"Magics SG+ Module," http://www.lrps.info/magics, Aug. 24, 2015 (3 pages).

* cited by examiner

METHODS AND SYSTEMS FOR 3D PRINTING WITH MODIFIABLE SUPPORT

BACKGROUND OF THE INVENTION

Field of the Invention

The present invention relates in general to computing systems, and more particularly, to various embodiments for 3D printing objects using a modifiable support.

Description of the Related Art 3D printing is a relatively new process of making solid, three dimensional objects from a digital file. 3D printing processes typically create the object using an additive process in which successive layers of material are laid down or deposited until an object with the desired size and shape is formed. Each of these layers may be considered to be a very thin horizontal cross-sectional "slice" of the end product.

Some of the concerns associated with current 3D printing methods and systems are speed, resource (or material) consumption, and material cost. For example, some current 3D printing systems print particular objects in such a way that an undesirably high amount of material is used, thus increasing the cost of the process.

SUMMARY OF THE INVENTION

Various embodiments for 3D printing an objet by a processor are described. In one embodiment, by way of example only, a method for 3D printing an object, again by a processor, is provided. An object is selected to be printed by a 3D printer. The 3D printer includes a structure. The structure is modified based on the selected object. The selected object is 3D printed by the 3D printer. At least a portion of the selected object is supported by the modified structure while the selected object is being 3D printed by the 3D printer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
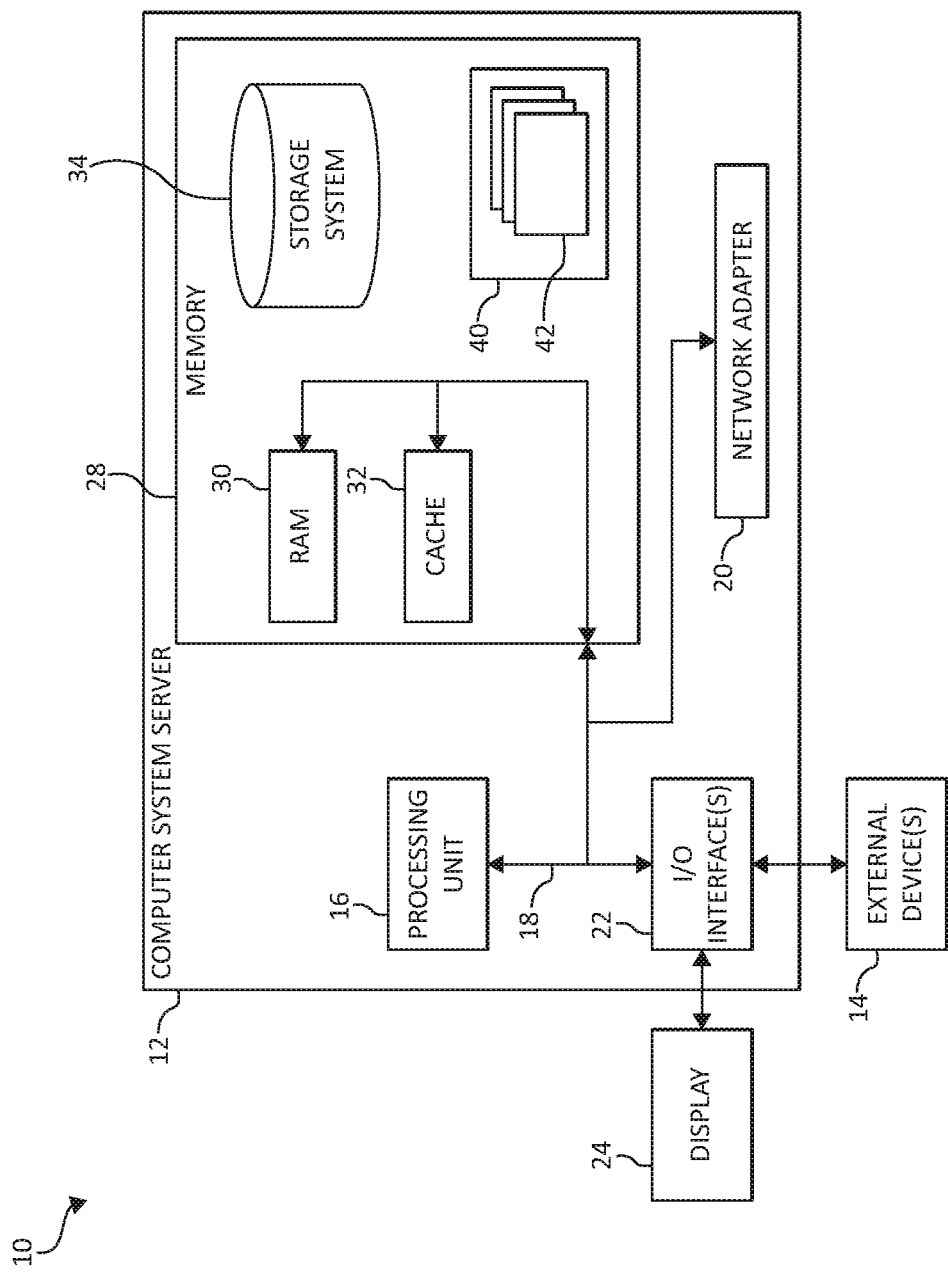
FIG. 1 is a block diagram depicting an exemplary computing node according to an embodiment of the present invention.

As previously indicated, as 3D printing becomes more common, there is a need to reduce the amount of material used by, and thus the costs of, the 3D printing processes. In some current 3D printing systems, depending on the size and shape of the printed object, an internal structure (e.g., an "infill") may be formed to provide rigidity and support to the object, which may be required at least during the 3D printing process. Additionally, during some 3D printing processes, extra objects (e.g., supports) may be formed to support the desired object during the 3D printing process.

As one example, consider a current 3D printing process that may be used to form a model bridge, which may be thought of in a simplified manner as including "towers" (e.g., the vertical structures of the bridge) and "spans" (e.g., the relatively thin, horizontal structures that interconnect the towers). Using conventional 3D printing processes, extra supports that are not included in the final, desired object may be formed below the spans to support the spans as they are being formed. Similarly, depending on the size (e.g., width) of the towers, an internal structure (or infill) may be formed within the towers during the 3D printing process to provide support for the structure during the formation process. The formation of these extra structures not only adds to the amount of material used by the 3D printing processes but also increases the time it takes to complete the 3D printing processes.

In view of the foregoing, a need exists for 3D printing methods and systems that minimize, or eliminate, the need for these extra structures.

To address these needs, the methods and systems of the present invention use, for example, a 3D printing system (or 3D printer) that includes a modifiable structure (e.g., a base). After the object to be 3D printed is selected, the structure is modified based on, for example, the size and shape of the selected object. The modified structure is used to, for example, support at least a portion of the object during the 3D printing process.

In some embodiments, the structure is modified by changing the shape of the structure (e.g., from a first shape to a second shape). The initial (or first) shape of the structure may include a substantially planar surface. The changing of the shape of the structure may cause the substantially planar surface to change to a profiled (or featured) surface.

The structure of the 3D printer may be a base (or support) that is positioned, for example, below a 3D printer head of the 3D printer. In some embodiments, the structure includes a plurality of sections (or portions), at least some of which are movable relative to each other, and the modifying of the structure includes moving at least some of the sections relative to at least some of the other sections. The movable sections of the structure may be configured to move in the same direction (i.e., each of the sections may move in a direction that is substantially parallel to the direction of movement of the other sections). In some embodiments, at least some of the movable sections are identical to each other. The modifying of the structure may include moving at least some of the sections towards the 3D printer head (e.g., raising the sections towards the 3D printer head).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing (or enabling or causing) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, hand-held or laptop devices, and network PCs. However, in some embodiments, some of the components depicted in FIG. 1 may be located in a 3D printing system (or 3D printer). For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
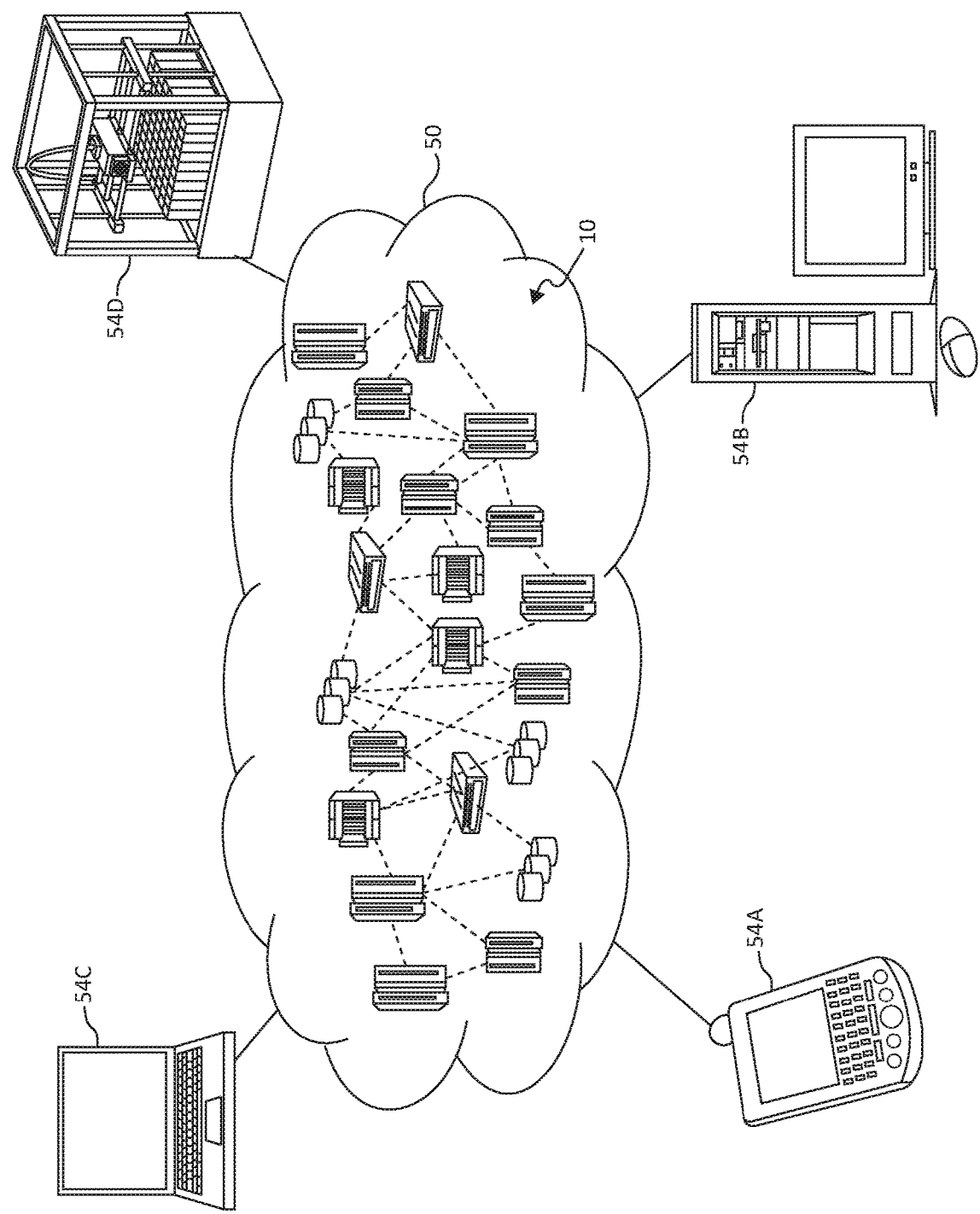
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA), cellular telephone, or tablet 54A, desktop computer 54B, and/or laptop computer 54C, as well as 3D printer 54D, may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
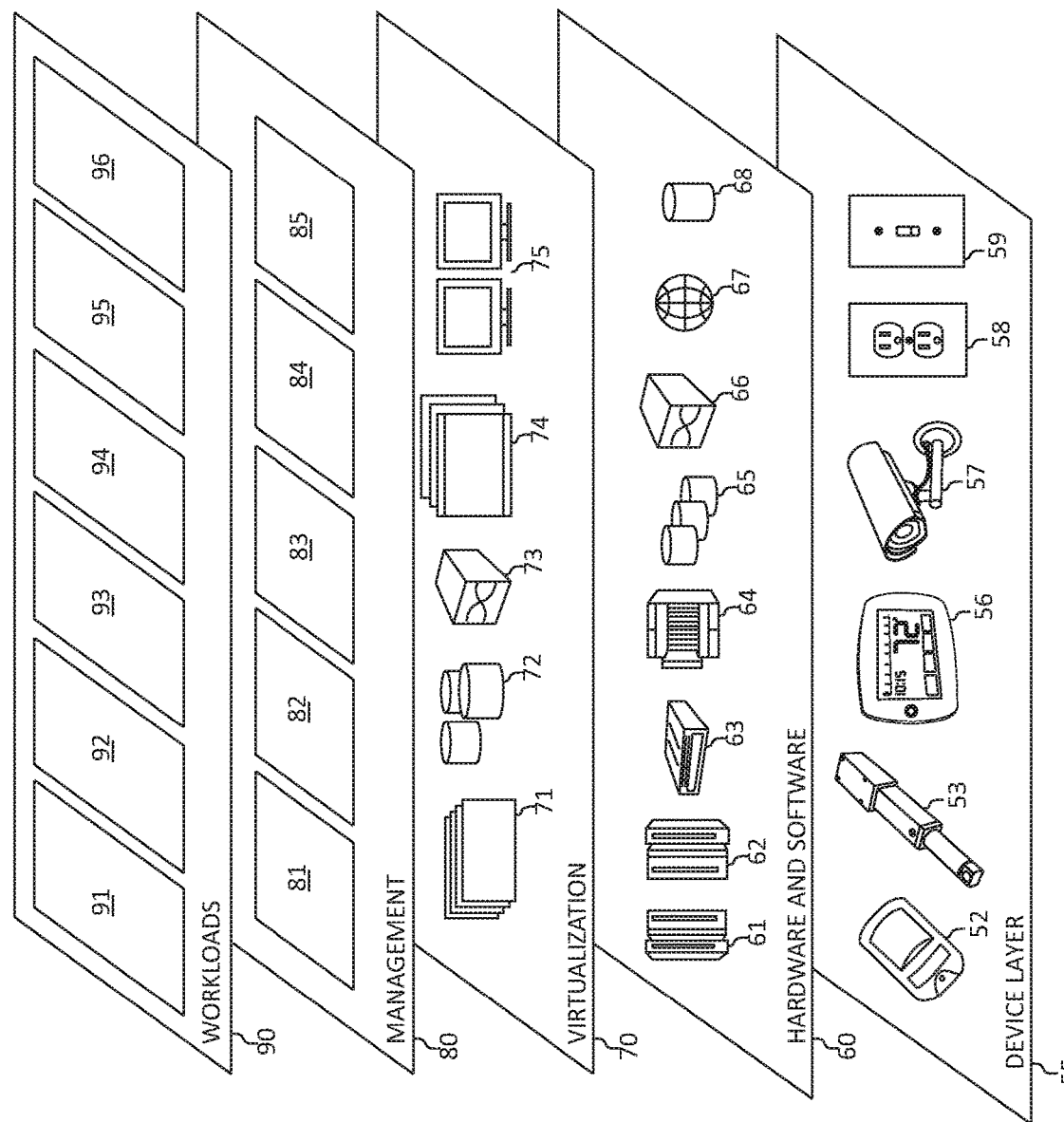
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to 3D printers, and various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for modifying structures within 3D printers and 3D printing objects. One of ordinary skill in the art will appreciate that the workloads and functions 96 for modifying structures within 3D printers and 3D printing objects may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the methods and systems of the illustrated embodiments provide novel approaches for 3D printing an object. In one example, after an object is selected to be 3D printed, a structure within (or coupled to) the 3D printer is modified based on the selected object (e.g., the size and/or shape of the object). The modified structure is used to support at least a portion of the object during the 3D printing process. In some embodiments, the structure is modified by changing the shape of the structure (e.g., from a first shape to a second shape). The initial (or first) shape of the structure may include a substantially planar surface. The changing of the shape of the structure may cause the substantially planar surface to change to a profiled (or featured) surface. After the 3D printing process is completed, the structure may be again modified (e.g., back to the first shape) to, for example, assist in removing the 3D printed object from the 3D printer.

Figure 4:
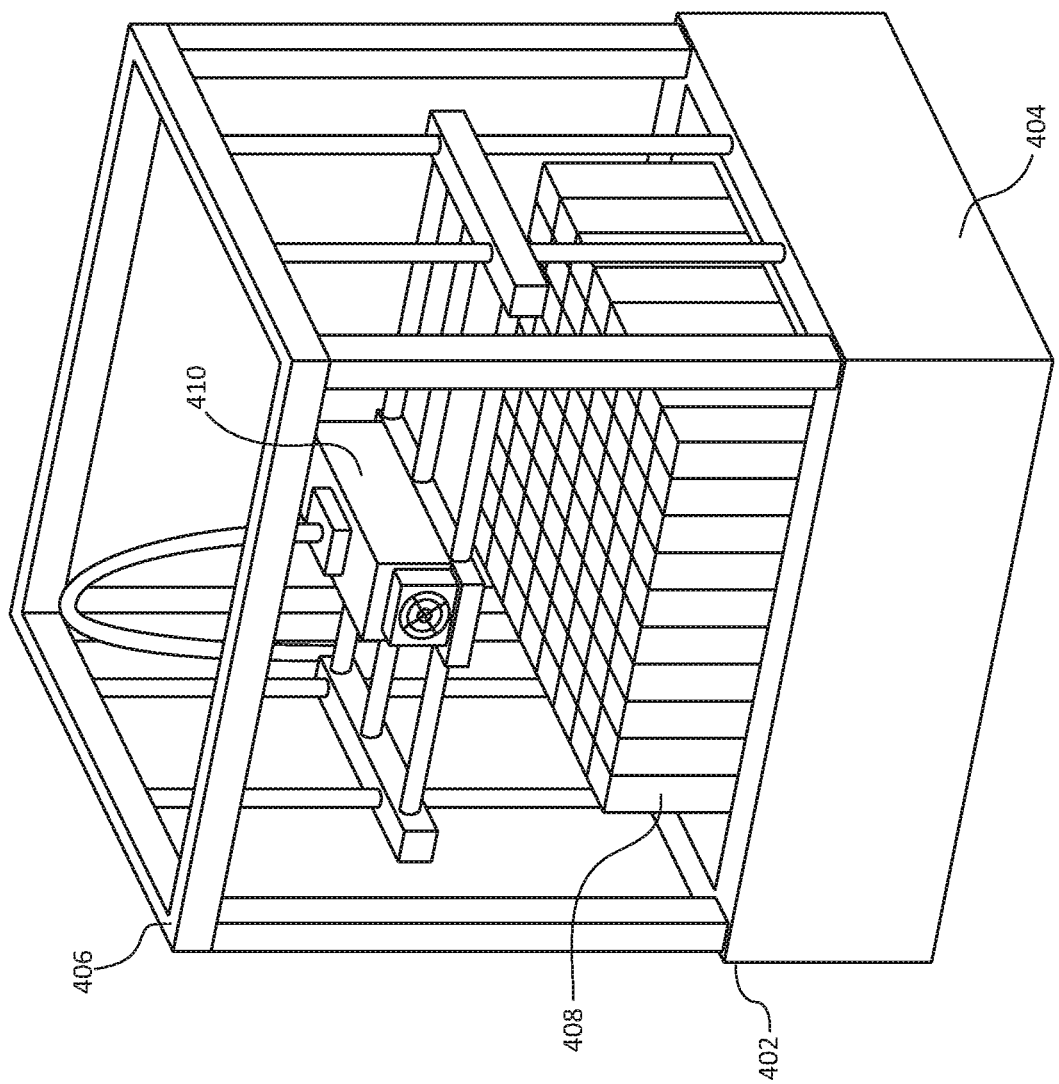
FIG. 4 is a perspective view of a 3D printer according to an embodiment of the present invention.

Referring to FIG. 4, an exemplary 3D printing system (or 3D printer) 400, according to some embodiments of the present invention, is shown. The 3D printer 400 includes a frame 402 with a lower portion 404 and an upper portion 406. The lower portion 404 houses a base (or support, or more generally, a structure) 408, such as those described in greater detail below, at a central portion thereof. The upper portion 406 of the frame 402 extends upwards from the lower portion 404 and includes a 3D printer head 410 as well as a series of members and/or actuators that support the 3D printer head 410, for example, above the base 408. Although not shown, the 3D printer head 410 may be coupled to (and/or in fluid communication with) a source of a material(s) (e.g., plastics, polymers, metals, etc.) that is deposited/dispensed by the 3D printer head 410 during a 3D printing process. As will be appreciated by one skilled in the art, the 3D printer head 410 may be able to translate horizontally across the base 408 and/or vertically relative to the base 408 and deposit/dispense the material(s) in a manner suitable for 3D printing processes.

Figure 5:
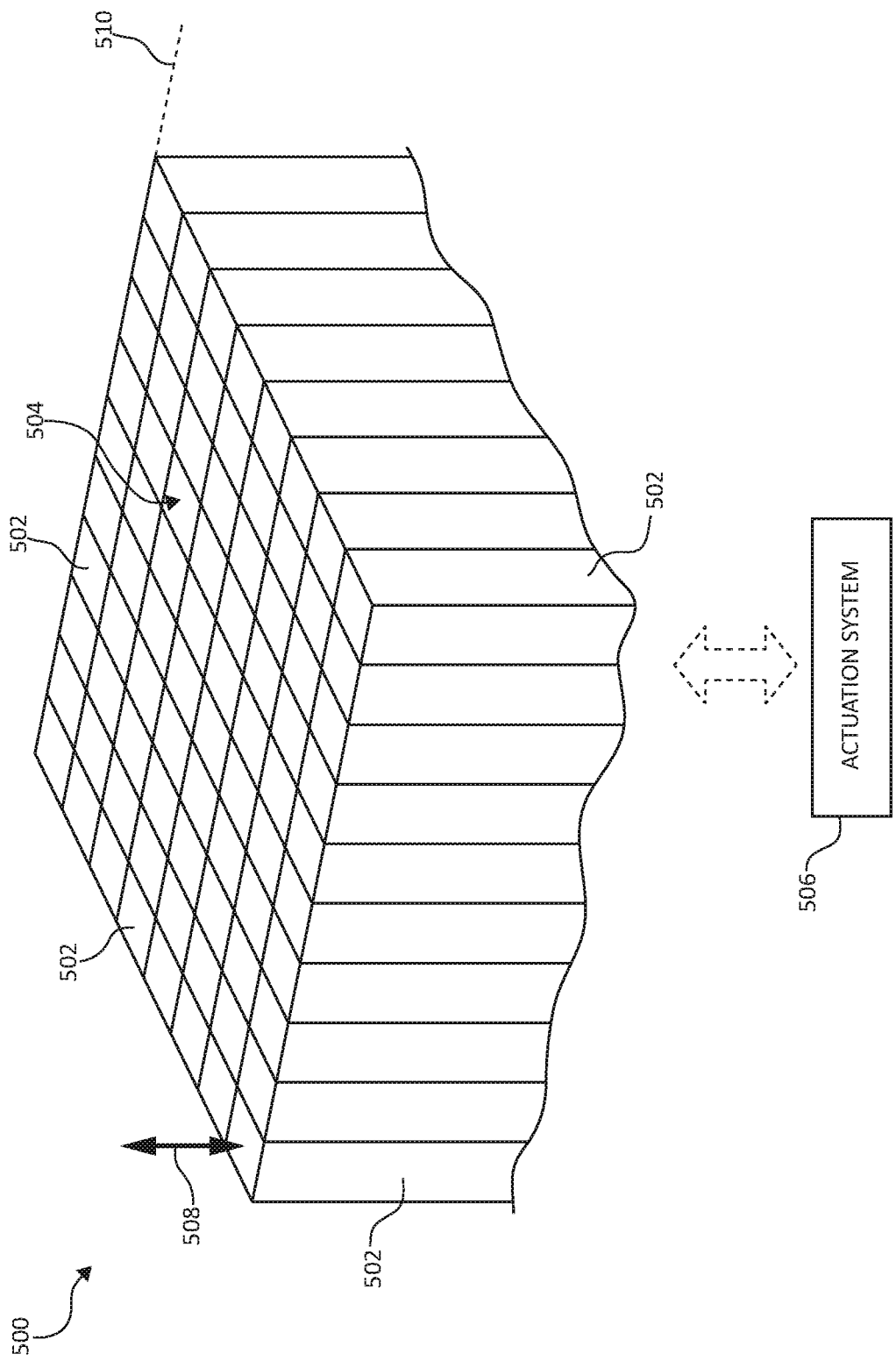
FIG. 5 is a simplified isometric schematic view of a structure and an actuation system within a 3D printer according to an embodiment of the present invention.

FIG. 5 illustrates an exemplary 3D printer base (or support or structure) 500 according to some embodiments of the present invention. In the depicted embodiment, the base 500 includes (or is made of) an array (or multiple rows) of columns (or movable sections or portions) 502. In the example shown, each of the columns 502 has a substantially uniform, square cross-section. However, in other embodiments, the columns 502 may have different shapes/cross-sections (e.g., rectangular, circular, etc.). The tops of the columns 502 jointly form a surface 504 (e.g., an upper surface) of the base 500.

In some embodiments, each of the columns 502 (e.g., a bottom end thereof) is coupled to an actuation system 506. Although not shown in detail, the actuation system 506 may include one or more actuators and/or power supplies (e.g., electrical, magnetic, electromagnetic, pneumatic, hydraulic, etc.) that are configured to cause the columns 502 of the base 500 to move. In the particular embodiment shown, the base 500 (and/or the columns 502) are arranged such that the upper surface 504 of the base 500 "faces" upwards, and the actuation system 506 is capable of causing each of the columns 502 to move in the direction indicated by bidirectional arrow 508. That is, as viewed in FIG. 5, the actuation system 506 (and/or the columns 502) are configured such that the columns 502 may be moved upwards and downwards, such as towards and away from a 3D printer head positioned above the base 500.

However, in some embodiments, the base (or structure) 500 may be arranged and/or oriented differently. For example, the base 500 and/or the columns 502 may be arranged such that the surface 504 of the base 500 faces horizontally (or in another non-vertical direction) or is a substantially vertical surface. That is, the base (or structure) 500 may be used as a "wall" in a 3D printer, and the movement of the columns 502 may be in a substantially horizontal direction. As another example, the columns 502 may be arranged as a "ceiling" in a 3D printer (e.g., above the 3D printer head) so that the surface 504 "faces" downward.

Still referring to FIG. 5, in some embodiments, all of the columns 502 are capable of being moved individually (e.g., relative to the others of the columns 502). However, it should be understood that in some embodiments, some portions of the base 500 may be stationary (and/or fixed relative to the frame of the 3D printer in which the base is utilized). As shown in FIG. 5, each of the columns 502 is positioned such that the (upper) surface 504 of the base 500 is substantially planar, at about the same height as reference line 510. The reference line 510 may be considered to represent the height of the tops of the individual columns 502 when the columns 502 are arranged by the actuation system 506 in their "centered" or "leveled" (and/or initial) positions (e.g., half way between the highest and lowest possible positions for the columns 502).

Although some embodiments of the base (or structure) described herein have discrete movable sections or portions (e.g., columns 502), it should be understood that in some embodiments, the base may be made of a single, integral piece of material. For example, the base may be made of a relative thin sheet of a pliable material that may be bent or bowed in such a manner to achieve the same basic effect of the modifications to the base (or structure) described herein.

Figure 6:
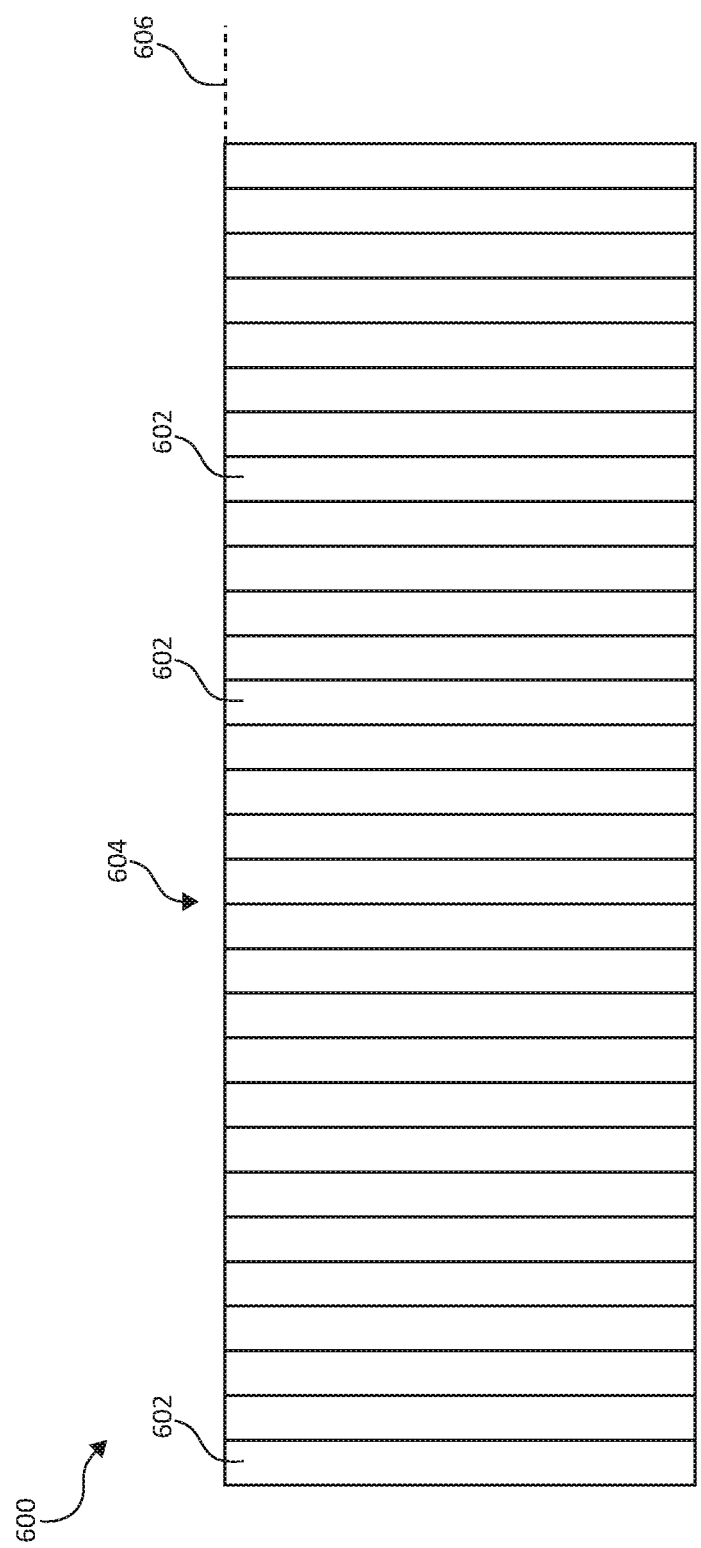
FIGS. 6-10 are cross-sectional side views of a structure within a 3D printer during a 3D printing process in accordance with aspects of the present invention.

FIG. 6 is a simplified cross-sectional (and/or side) view of an exemplary 3D printer base (or support or structure) 600 according to some embodiments of the present invention. Although only a single row of columns 602, it should be understood that the base 600 may include multiple rows of columns, and each of the columns may be coupled to an actuation system in a manner similar to the example shown in FIG. 5. As shown in FIG. 6, each of the columns 602 is in its "centered" position such that an upper surface 604 of the base 600 is substantially planar and at the same height as reference line 606.

In some embodiments, an object to be 3D printed is first selected and an indication of the selected object is received. The selection of the object may be performed using any suitable method, such as a manual selection on the 3D printer, through an electronic message (e.g., email, text, etc.), through a website/server, etc.

Figure 7:
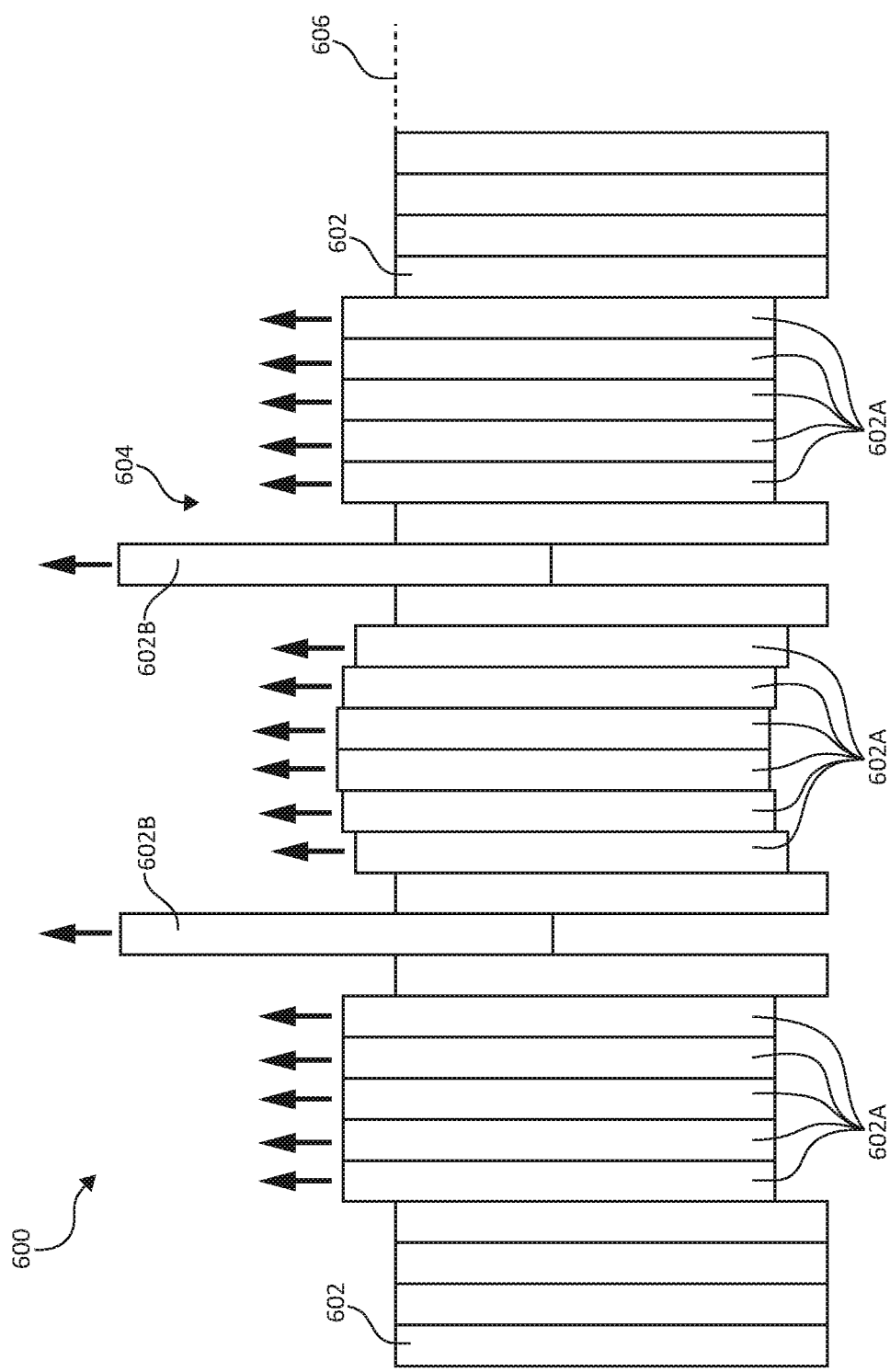

Referring now to FIG. 7, after the object to be 3D printed is selected, the base 600 is modified based on the selected object (e.g., based on the size and/or shape of the selected object). In the example shown in FIG. 7, specific ones of the columns (i.e., columns 602A and 602B) are moved relative to reference line 606, to varying degrees. More specifically, in the depicted embodiment, each of the columns 602A and 602B is raised such that the top ends thereof extend above reference line 606, with columns 602B being raised significantly more (or higher) than columns 602A. As a result, the overall shape of the base 600 is changed, and the upper surface 604 of the base 600 is no longer substantially planar (e.g., the upper surface 604 is profiled and/or featured).

In some embodiments, after the base 600 is modified, a 3D printing process may be performed above (and/or on) the base 600, or more particularly, above (and/or on) the now profiled upper surface 604 of the base 600. As is commonly understood, the 3D printing process may be performed by a 3D printer head positioned, for example, above the base 600, which deposits/dispenses material in an appropriate manner given the size and shape of the object that has been selected to be 3D printed. In the embodiments described below and shown in FIGS. 8-13, the object being 3D printed is a model bridge. However, it should be understood that this is merely an example that has been selected because of its shape, and in other embodiments, objects of other sizes, shapes, etc. may formed using the 3D printing processes described herein.

Figure 8:
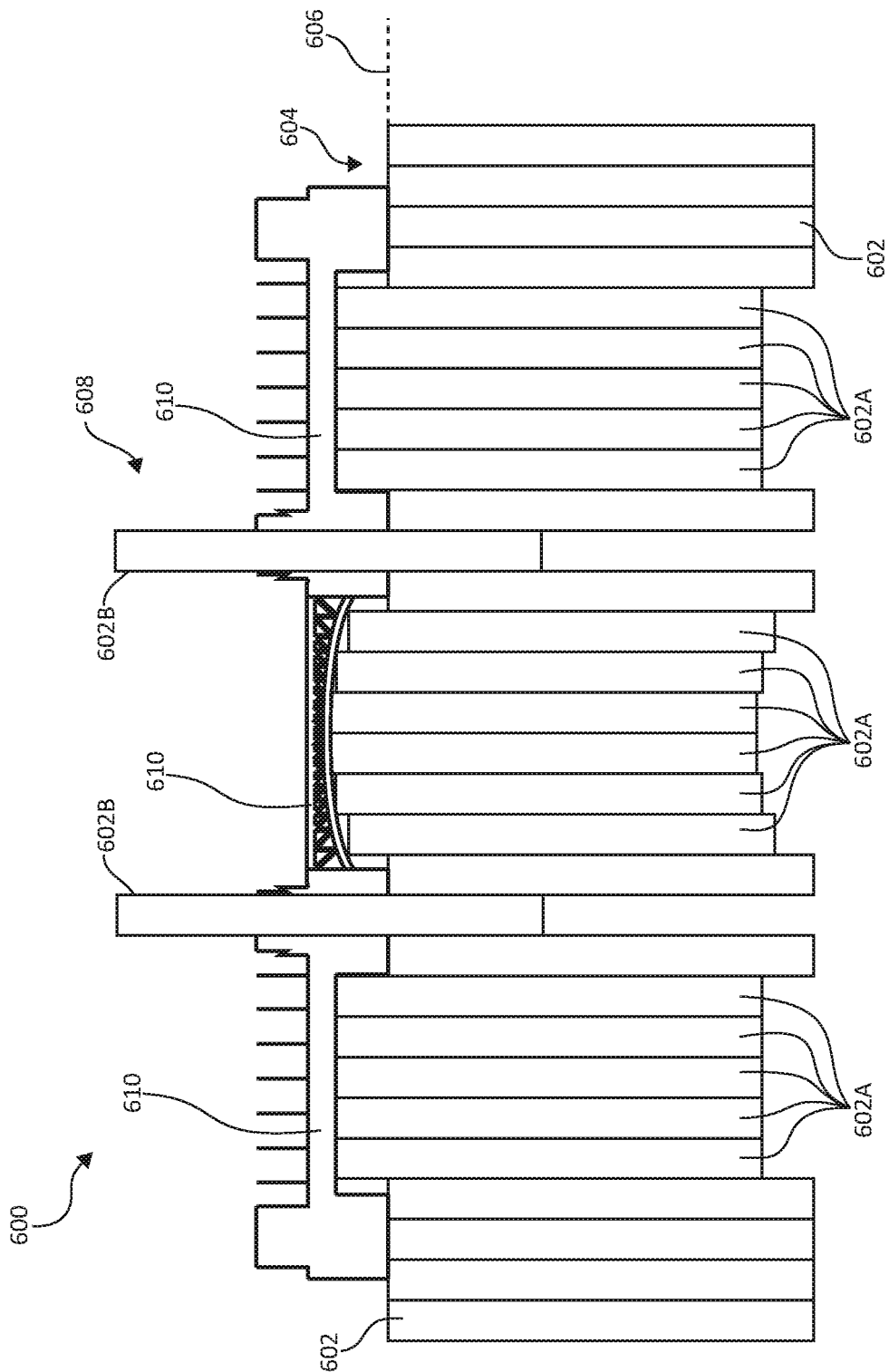

FIG. 8 illustrates the model bridge (i.e., a partially completed model bridge 608) during the 3D printing process. As shown in the depicted embodiment, during the 3D printing process, spans 610 of the bridge 608 are supported by columns 602A. As a result, no extra parts or supports may be required to be formed during the 3D printing process to support the spans 610 (e.g., at least the portions of the spans 610 shown in FIG. 8). Rather, the upper surface 604 of the base 600, due to its modified shape, may support the spans 610, at least in part. However, although not shown, it should be understood that in some embodiments, depending on the exact shape of the object being printed, temporary supports for particular portions of the object (e.g., curved sections) may be formed during the 3D printing process. However, even in such embodiments, the temporary supports may be made smaller (e.g., due to the profiled shape of the base 600) when compared to those formed during conventional 3D printing processes.

Figure 9:
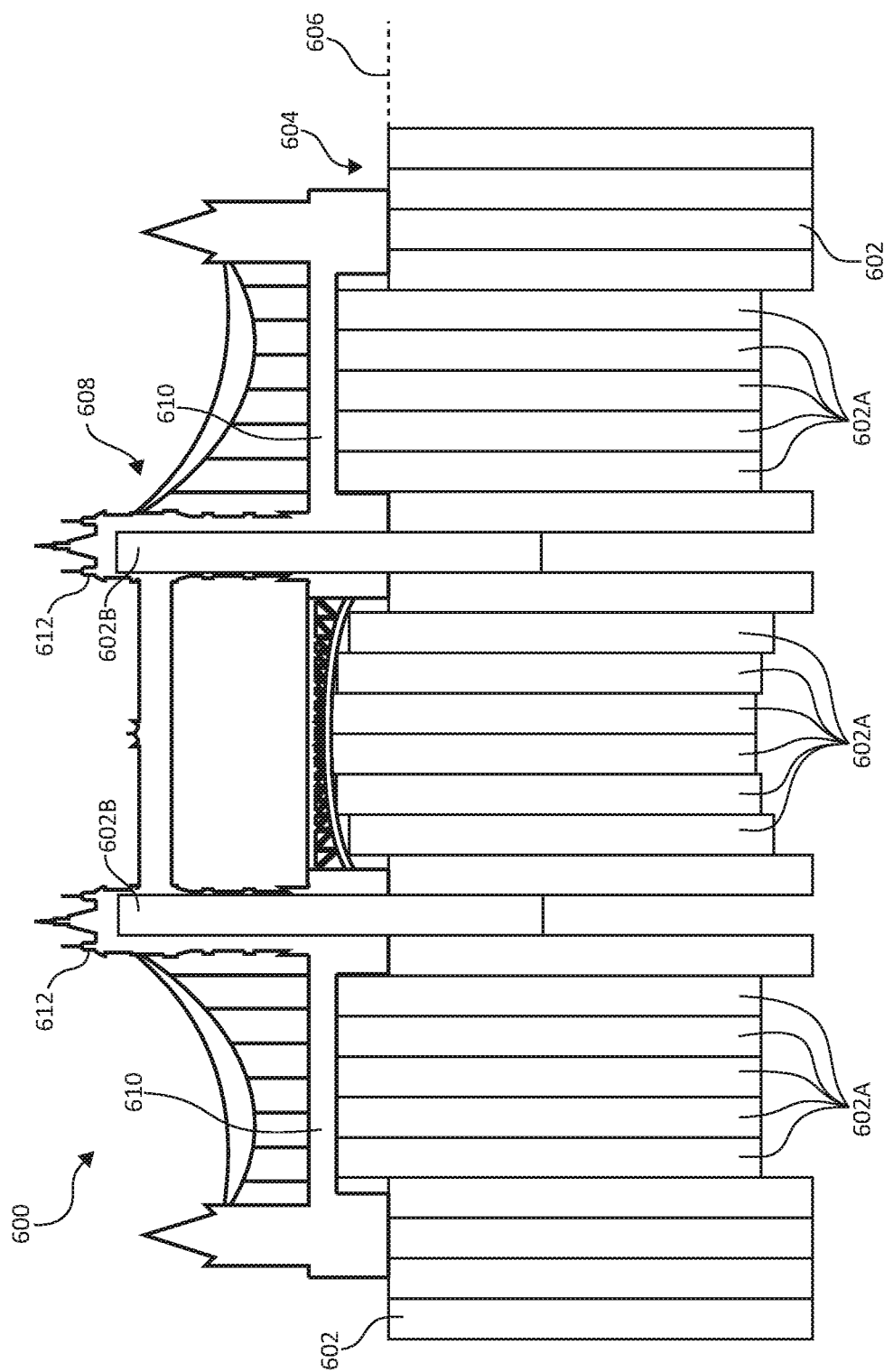

FIG. 9 illustrates the model bridge 608 after the deposition/dispensing of the material used to form the model bridge 608. As shown, the model bridge 608 also includes towers 612, which, as is evident in FIG. 9, are supported by and/or formed around columns 602B during the 3D printing process. As a result, no internal structure (or infill) may be required to be formed within the towers 612 during the 3D printing process, at least in some embodiments. In the embodiment shown in FIG. 9, columns 602B extend nearly the entire height and width of the towers 612 such that the material deposited over columns 602B to form the towers 612 is relatively thin. In other embodiments, the columns 602 (or the corresponding portions of another base) may be thinner and/or shorter relative to the size of the corresponding portion of the 3D printed object (e.g., the thickness of and/or the height of the modified portions of the base 600 may be changed to adjust the thickness of the "shell" of the 3D printed object).

Figure 10:
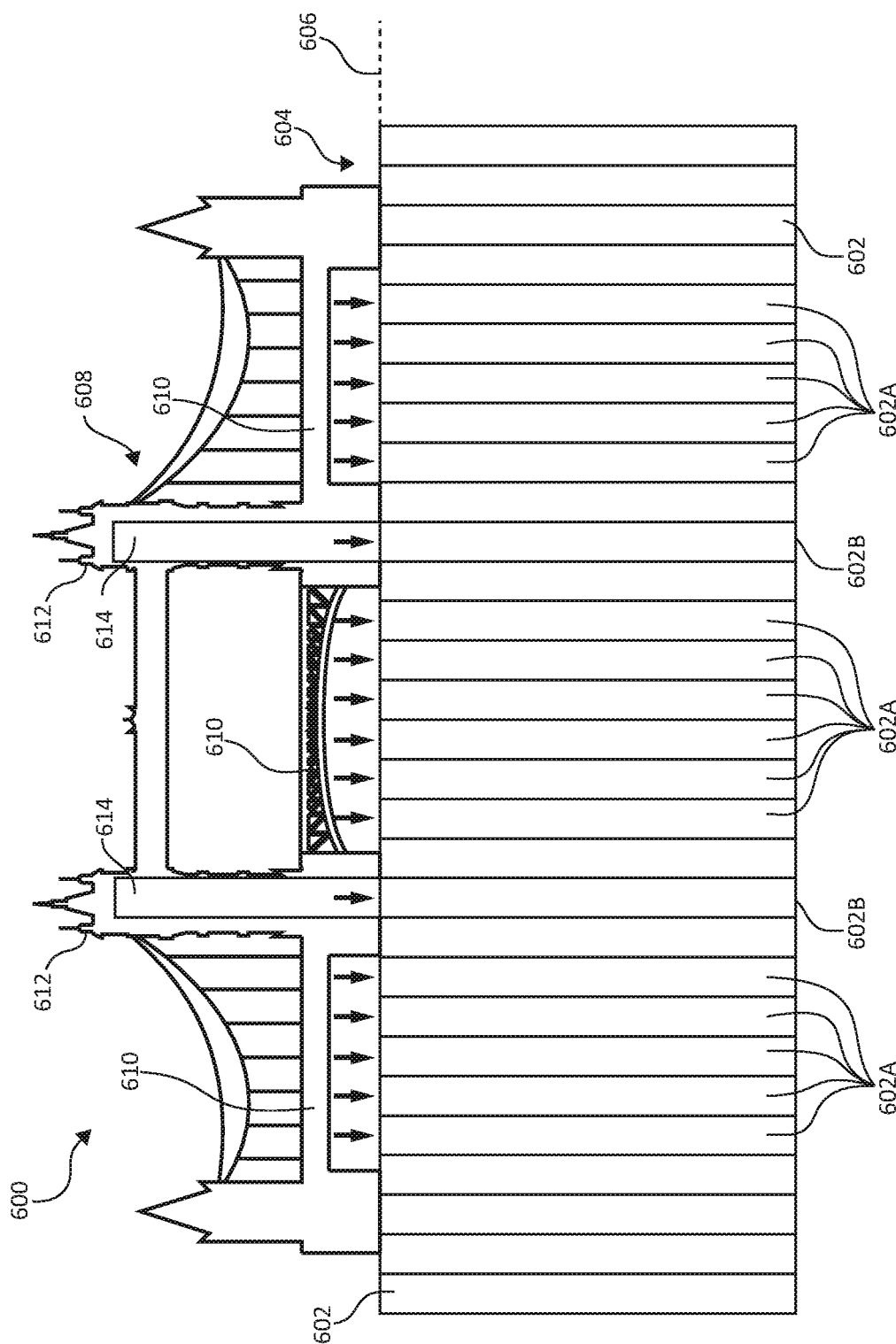

Referring to FIG. 10, in some embodiments, after the 3D printing process is complete and/or the material used to form the bridge 608 has dried or cured, the columns 602 that were moved before the 3D printing process (e.g., columns 602A and 602B) are returned to their original positions (e.g., lowered such that the top ends thereof are level with reference line 606). The completed 3D printed object, in this case the bridge 608, may then be removed (e.g., lifted from) the base 600. However, it should be understood that in at least some embodiments the columns 602 that were moved to provide the base 600 with the profiled or featured shape may remain in their moved (e.g., raised) positions while the 3D printed object is removed from the base 600. Also, it may be beneficial to move particular columns 602 (e.g., columns 602B) in a direction (e.g., up) to further profile the upper surface 604 of the base 600 to assist in the removal of the 3D printed object from the base 600 (e.g., columns 602B may be further raised to lift the object off of the other columns 602 and 602A).

Still referring to FIG. 10, of particular interest are the voids 614 formed in the towers 612 of the bridge 608 from columns 602B being removed therefrom. That is, the voids 614 may be formed by the particular columns 602 (i.e., columns 602B) that were used during the 3D printing process to support the towers 612 of the bridge 608.

Figure 11:
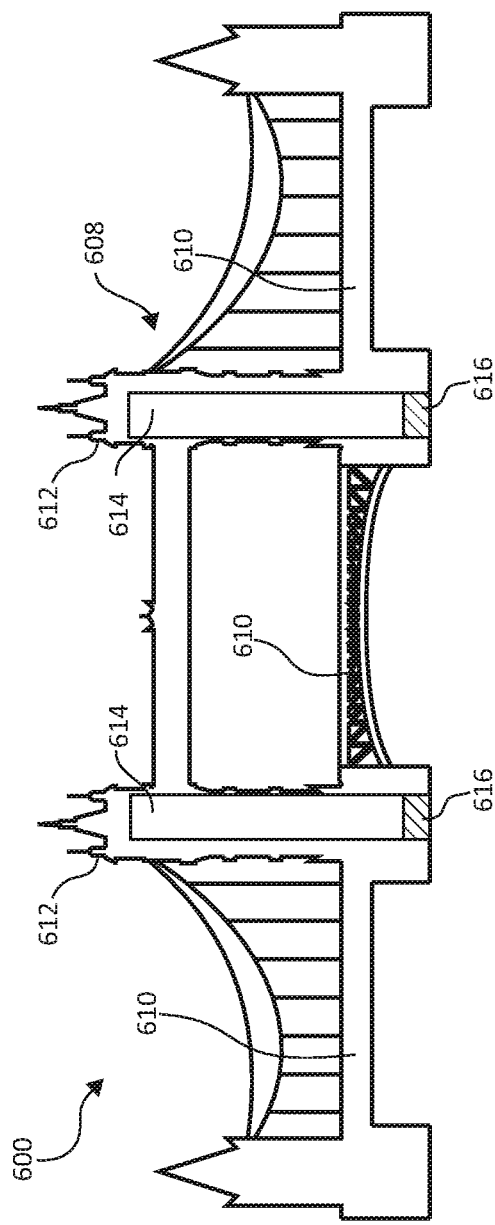
FIG. 11 is a cross-sectional side view of a 3D printed object according to an embodiment of the present invention.
Figure 12:
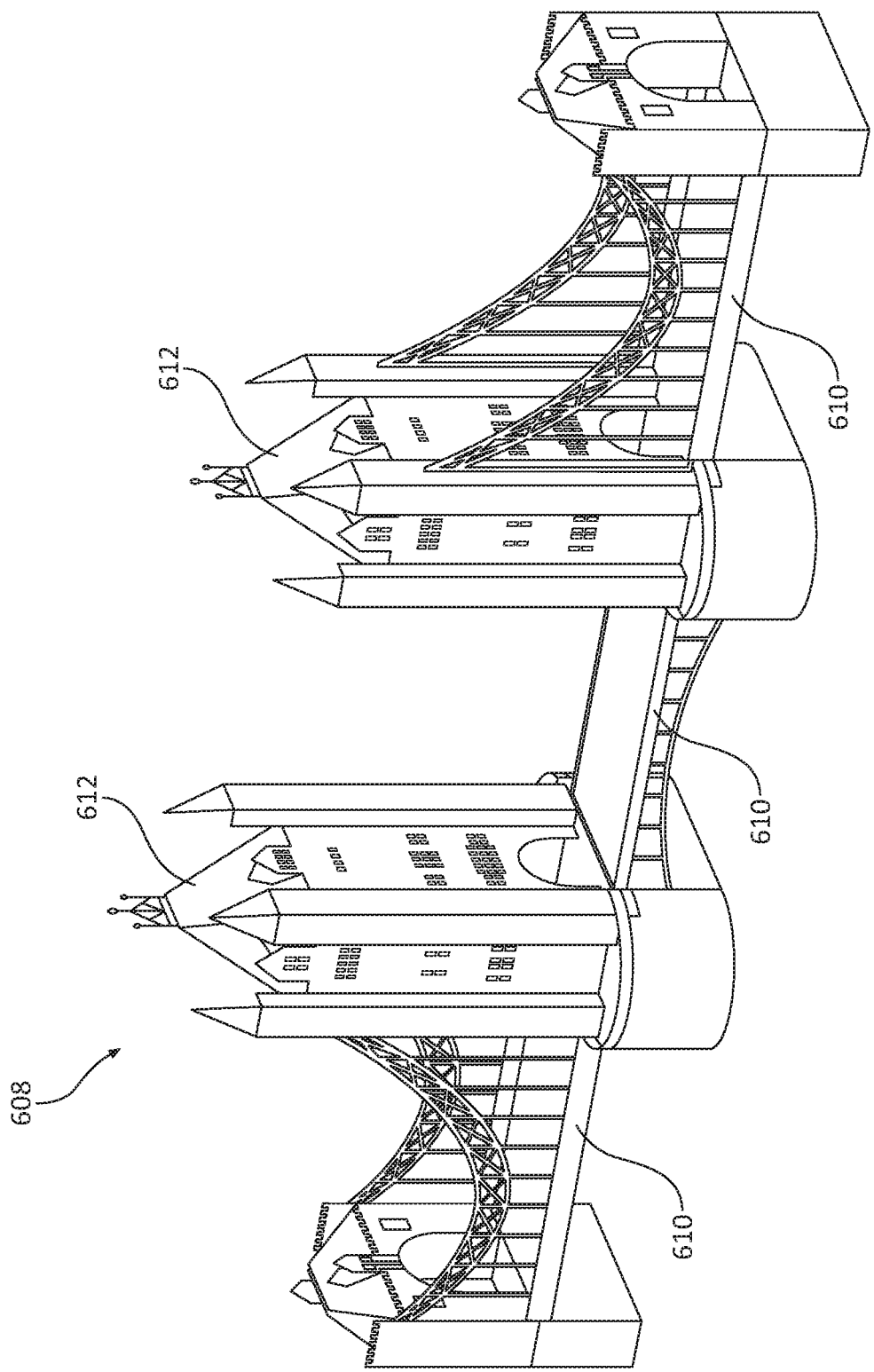
FIG. 12 is an isometric view of the 3D printed object of FIG. 11.

As shown in FIG. 11, after the 3D printed object (e.g., the bridge 608) is removed from the base 600, caps (or plugs) 616 may be inserted into the openings of the voids 614 (e.g., formed at the bottom of the towers 612 of the bridge 608). The caps 616 may be formed using, for example, a 3D printing process. However, any suitable sized/shaped component, made from any appropriate material (e.g., plastics, polymers, metals, etc.), by any process, may be used. FIG. 12 illustrates the 3D printed object (e.g., the bridge 608) after the completion of the 3D printing process.

Figure 13:
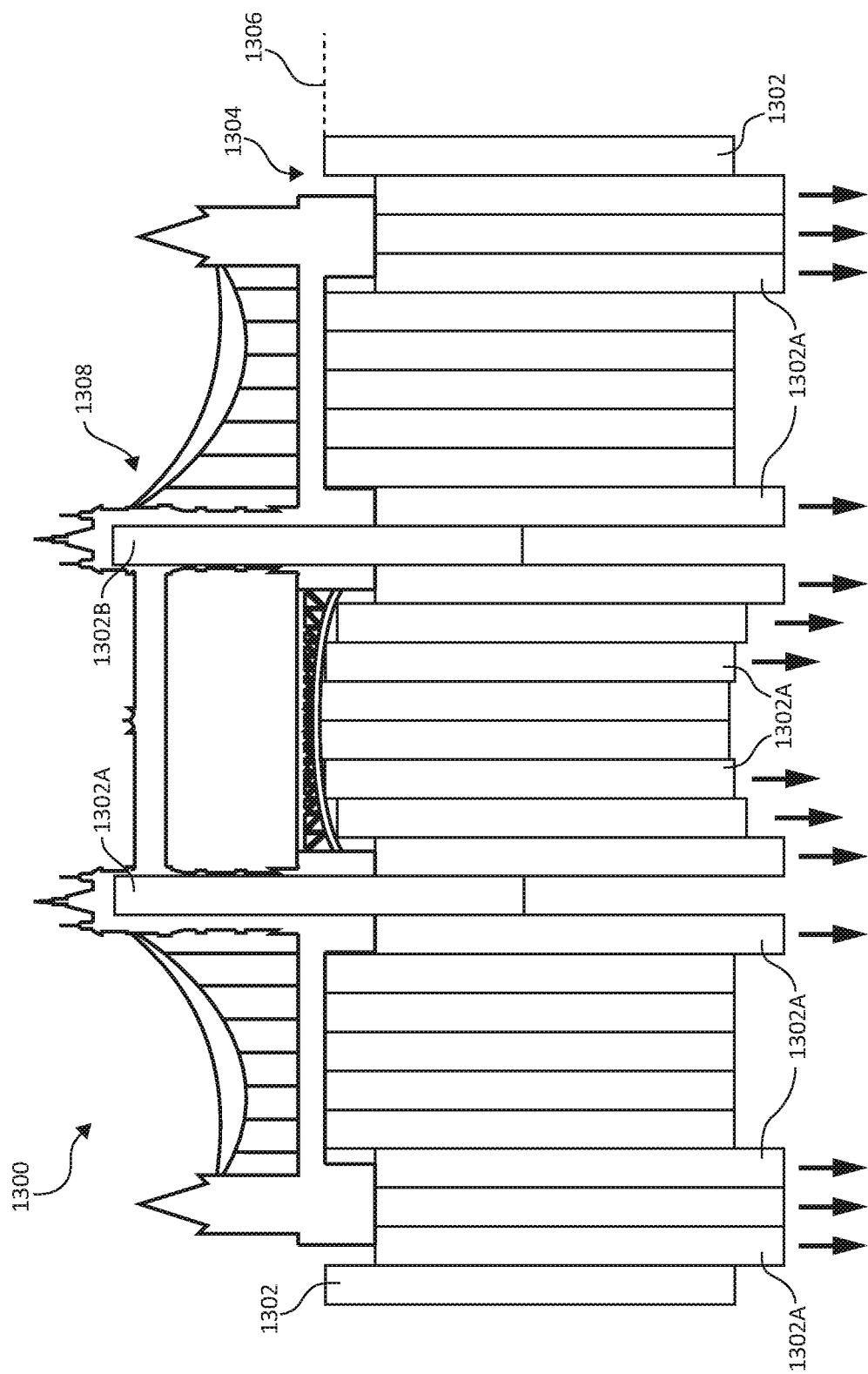
FIG. 13 is a cross-sectional side view of a structure within a 3D printer during a 3D printing process in accordance with aspects of the present invention.

FIG. 13 illustrates a 3D printer base 1300 according to another embodiment of the present invention. The base 1300 may be similar to the base 600 described above, and likewise includes (or is made of) multiple movable columns 1302, the top ends thereof forming an upper surface 1304 of the base 1300. Reference line 1306 represents the position (or height) of the top ends of the columns 1302 when the columns are in their "middle" or "leveled" positions.

In the particular embodiment shown in FIG. 13, in order to modify (e.g., change the shape of) the base 1300 and/or profile/feature the upper surface 1304 of the base 1300, some of the columns 1302 are lowered and some of the columns 1302 are raised. In particular, columns 1302A have been lowered so that the top ends thereof are below reference line 1306, and columns 1302B have been raised so that the top ends thereof are above reference line 1306. It should be noted that the upper surface 1304 of base 1300 has essentially the same shape/profile as that of base 600 shown in FIGS. 7-9. Thus, a 3D printed object may be formed in a similar manner to that shown in FIGS. 8-10. More particularly, in FIG. 13, a model bridge 1308 may be formed in a similar manner to model bridge 608 described above.

Figure 14:
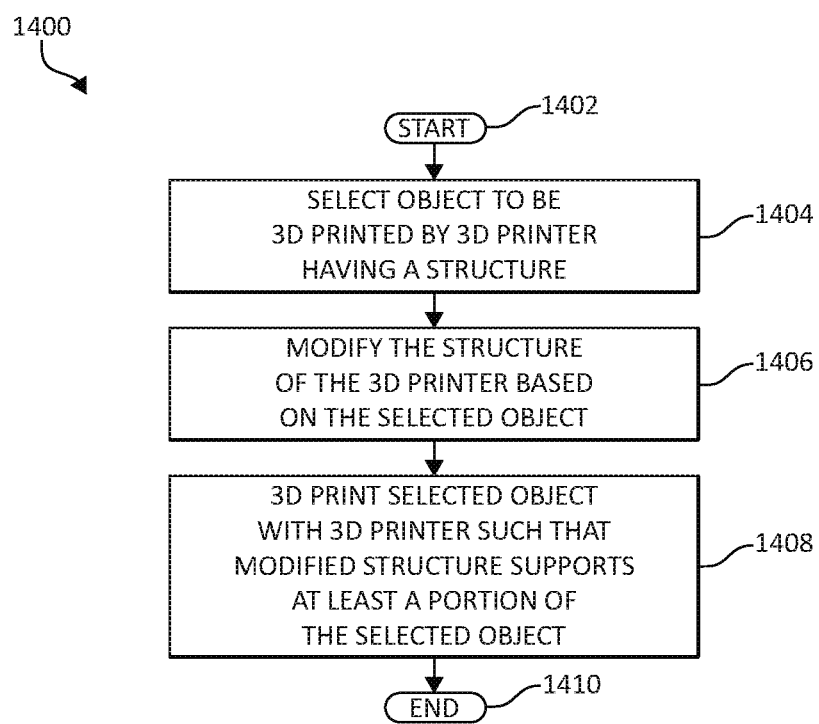
FIG. 14 is a flowchart diagram depicting an exemplary method for 3D printing an object in which various aspects of the present invention may be implemented.

Turning to FIG. 14, a flowchart diagram of an exemplary method 1400 for 3D printing an object, utilizing some aspects of the embodiments described herein, is illustrated. Method 1400 begins (step 1402) with, for example, an appropriate 3D printer being prepared for a 3D printing process. The object to be 3D printed by the 3D printer is selected (and/or an indication of the selected object is received) (step 1304). The 3D printer used for the 3D printing process includes a structure (e.g., a support or a base), such as those described above.

The structure is modified based on the object selected to be 3D printed (step 1406). As described above, the modification of the structure may include causing at least some sections or portions of the structure to move relative to other sections or portions of the structure. In some embodiments, the modification of the structure includes changing a shape of the structure (e.g., changing a shape or profile of a surface of the structure).

After the structure is modified, a 3D printing process is performed to form the selected object (step 1408). During the 3D printing process, the modified structure (or at least a portion thereof) supports at least a portion of the object being 3D printed. As described above, at least some portions of the object being 3D printed may be formed around portions of the modified structure.

Method 1400 ends (step 1410) with, for example, the completion of the 3D printing process and/or the completed 3D printed object being removed from the 3D printer (and/or being removed from the structure). In some embodiments, before the 3D printed object is removed from the 3D printer, the structure is again modified (e.g., back to its state/shape before the initial modification).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for 3D printing an object, comprising:
selecting an object to be printed by a 3D printer comprised of a frame having a lower portion and an upper portion, and a structure having a plurality of movable sections disposed within the lower portion, wherein the upper portion is of an open-frame configuration having a plurality of vertical and horizontal supporting members and extends upward from the lower portion, wherein the lower portion is of a closed-frame configuration and encloses a base of the frame containing an actuation system, wherein, when in an initial position, each of the plurality of movable sections are positioned at a first, same height commensurate with a reference line above the base of the frame such that a top surface of each of the plurality of movable sections are flush with one another and together form a level surface of the structure at the reference line in a mid-section of the upper portion;
in response to selecting the object and prior to commencing printing of the selected 3D object, causing the structure to be modified from a first, planar shape of the initial position to a second, featured shape based on a shape of the selected object to be printed, wherein the causing of the structure to be modified includes causing at least some of the plurality of movable sections to move relative to the others of the plurality of movable sections, wherein, when in the initial position, each of the plurality of movable sections is centered halfway between a highest and lowest possible position each respective section of the plurality of movable sections is able to move, and wherein the moving of the at least some of movable sections relative to one another includes causing a first number of the plurality of movable sections to be raised to a second height above the reference line above the base of the frame and a second number of the plurality of movable sections to be lowered from the initial position to a depth below the reference line beneath the base of the frame when the structure is in the second, featured shape;
in response to selecting the object and causing the structure to be modified from the first, planar shape to the second, featured shape, commencing printing of the 3D object, wherein the modified structure is fixed in the second, featured shape from the commencement of the printing of the 3D object until a completion of the printing of the 3D object; and
printing the selected object by the 3D printer utilizing at least one of a plastic and a polymer, wherein at least a portion of the selected object is supported by the modified structure of the second, featured shape while the selected object is being 3D printed by the 3D printer.

2. The method of claim 1, wherein the plurality of movable sections are each configured to move in a direction that is substantially parallel to that of the others of the plurality of movable sections.

3. The method of claim 2, wherein the plurality of movable sections are substantially identical.

4. The method of claim 1, wherein the 3D printer further includes a 3D printer head positioned above the structure.

5. A computer program product for 3D printing an object by a processor, the computer program product comprising a non-transitory computer-readable storage medium having computer-readable program code portions stored therein, the computer-readable program code portions comprising:
an executable portion that selects an object to be printed by a 3D printer comprised of a frame having a lower portion and an upper portion, and a structure having a plurality of movable sections disposed within the lower portion, wherein the upper portion is of an open-frame configuration having a plurality of vertical and horizontal supporting members and extends upward from the lower portion, wherein the lower portion is of a closed-frame configuration and encloses a base of the frame containing an actuation system, wherein, when in an initial position, each of the plurality of movable sections are positioned at a first, same height commensurate with a reference line above the base of the frame such that a top surface of each of the plurality of movable sections are flush with one another and together form a level surface of the structure at the reference line in a mid-section of the upper portion;

an executable portion that, in response to selecting the object and prior to commencing printing of the selected 3D object, causes the structure to be modified from a first, planar shape of the initial position to a second, featured shape based on a shape of the selected object to be printed, wherein the causing of the structure to be modified includes causing at least some of the plurality of movable sections to move relative to the others of the plurality of movable sections, wherein, when in the initial position, each of the plurality of movable sections is centered halfway between a highest and lowest possible position each respective section of the plurality of movable sections is able to move, and wherein the moving of the at least some of movable sections relative to one another includes causing a first number of the plurality of movable sections to be raised to a second height above the reference line above the base of the frame and a second number of the plurality of movable sections to be lowered from the initial position to a depth below the reference line beneath the base of the frame when the structure is in the second, featured shape;

an executable portion that, in response to selecting the object and causing the structure to be modified from the first, planar shape to the second, featured shape, commences printing of the 3D object, wherein the modified structure is fixed in the second, featured shape from the commencement of the printing of the 3D object until a completion of the printing of the 3D object; and an executable portion that prints the selected object by the 3D printer utilizing at least one of a plastic and a polymer, wherein at least a portion of the selected object is supported by the modified structure of the second, featured shape while the selected object is being 3D printed by the 3D printer.

6. The computer program product of claim 5, wherein the plurality of movable sections are each configured to move in a direction that is substantially parallel to that of the others of the plurality of movable sections.

7. The computer program product of claim 6, wherein the plurality of movable sections are substantially identical.

8. The computer program product of claim 5, wherein the 3D printer further includes a 3D printer head positioned above the structure.

\* \* \* \* \*